United States Patent [19]

Kirk

[11] 3,970,034

[45] July 20, 1976

[54] PISTON POSITION SENSING DEVICE

[75] Inventor: Colin John Kirk, Twickenham, England

[73] Assignee: Martonair Limited, Twickenham, England

[22] Filed: Feb. 27, 1975

[21] Appl. No.: 553,742

[30] Foreign Application Priority Data

Mar. 9, 1974 United Kingdom ............... 10635/74

[52] U.S. Cl. .............................. 116/124 D; 137/555

[51] Int. Cl.[2] ........................ G01D 5/42; G09F 9/00

[58] Field of Search .................... 116/124 D, 124 R; 137/553, 555; 73/432 R, 116

[56] References Cited

UNITED STATES PATENTS

| | | | |
|---|---|---|---|
| 2,371,893 | 3/1945 | Hyland | 116/124 R X |
| 2,746,418 | 5/1956 | Loss | 116/124 R |
| 2,891,573 | 6/1959 | Dobleske | 137/553 |

*Primary Examiner*—Jerry W. Myracle
*Attorney, Agent, or Firm*—Gifford, Chandler & Sheridan

[57] ABSTRACT

A sensing device for sensing the position of a movable element in a fluid-operable actuator including a relatively movable piston and cylinder. The sensing device includes a pair of co-operating pressure tappings in the cylinder wall, a pair of peripheral and axially spaced seals on the piston for sealing between the piston and the cylinder wall and a detector responsive to the pressure at the pressure tappings by producing an output indicating piston position. The spacing of the pressure tappings is greater than the axial width of each of the seals and less than the axial distance between the seals.

9 Claims, 5 Drawing Figures

PISTON POSITION SENSING DEVICE

BACKGROUND OF THE INVENTION

This invention relates to position sensing in fluid-operable actuators using pressure tappings and is particularly concerned with an improvement in or modification of the pressure tapping arrangement for sensing the position of a piston in a cylinder, the subject of our British Pat. No. 1,350,006. That specification is concerned with the provision of pressure tappings, and in particular co-operating pairs of pressure tappings, in a fluid-operable actuator including a relatively movable piston and cylinder. When the piston passes a position in the cylinder corresponding to a particular pressure tapping, there will be a change in the pressure at the tapping and so the pressure at the tappings is sensed to determine piston position. By using co-operating pairs of pressure tappings it is possible to determine piston position by sensing the pressure differential, if any, between the pressures at a pair of pressure tappings. Thus, when the piston moves to a position between a pair of pressure tappings, there is a pressure differential between them, whereas when the piston is at a position to one side of both the pressure tappings the pressure is approximately the same at both pressure tappings.

It is now appreciated that an improved response to position changes of the piston may be achieved by using a particular arrangement of pressure tappings.

SUMMARY OF THE INVENTION

According to the invention, a sensing device for sensing the position of a movable element in a fluid-operable actuator including a relatively movable piston and cylinder comprises a pair of co-operating pressure tappings in the cylinder wall, a pair of seals on the piston for sealing between the piston and the adjacent cylinder wall and spaced apart in the directions of said relative movement, the spacing of the pressure tappings being greater than the width of each of the seals in the directions of said relative movement and less than the distance between the seals in the directions of said relative movement, and detector means responsive to the pressure at said pressure tappings by producing an output indicating piston position.

Preferably, the detector means is arranged to respond to a pressure difference between said tappings by producing an output indicating that the piston is at a position in which the region between the piston seals is aligned with one of the tappings and the other tapping is at a position beyond one of the seals.

The seals are conveniently of cup-shape in cross-section and may be arranged back-to-back but spaced apart axially on the piston. In such an arrangement the between-seal pressure is normally atmospheric. With this arrangement, when the piston moves into a position in which the region between the piston seals is aligned with a tapping, there is a pronounced pressure change from the exhaust pressure to atmospheric pressure. If the piston is being rapidly moved towards that tapping the exhaust pressure can be well above atmospheric pressure and so there would be a pressure differential between the pressure detected by the tapping communicating with the region between the piston seals and the pressure at either side of the piston. Thus, the detector means gives a more pronounced indication of the position of the piston.

Alternatively the seals may be of cup-shape in cross-section and arranged with their rims facing each other but spaced apart axially on the piston, the outboard pressure tapping of each end pair of pressure tappings being so positioned that it communicates only with a cushioning region between the outboard end of the piston and the adjacent end of the cylinder and cannot communicate with the region between the piston seals.

BRIEF DESCRIPTION OF THE DRAWINGS

Several piston position sensing devices in accordance with the invention are now described by way of example with reference to the accompanying drawings, in which.

DESCRIPTION OF THE PREFERRED EMBODIMENT

Figure 1:
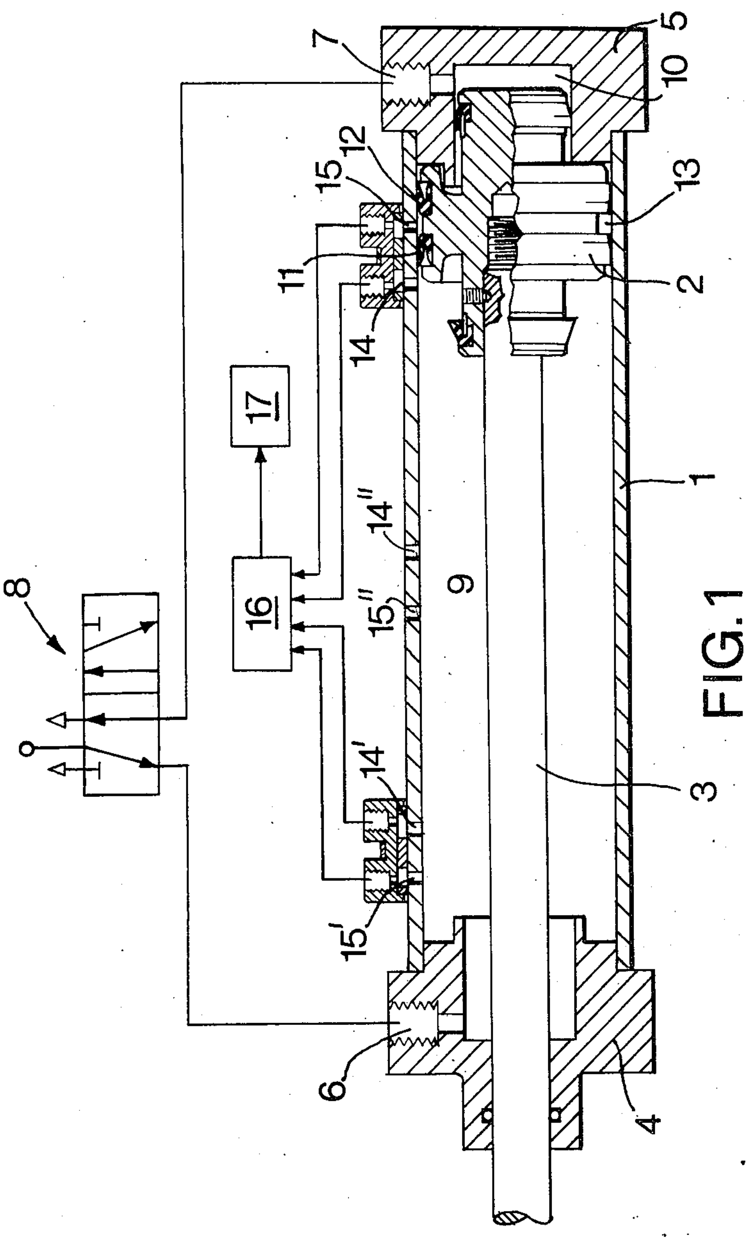
FIG. 1 is an axial sectional view through an actuator comprising a cylinder and piston and incorporating a first piston position sensing device and also shows an accompanying fluid circuit.

The actuator shown in FIG. 1 is pneumatically-operated (but may be operable by any suitable pressurised fluid) and comprises a cylinder 1 in which a piston 2 is slidable. the piston is carried by a piston rod 3 extending in known manner through one, 4, of a pair of end plates 4, 5. Each end plate 4, 5 has a port 6, 7, respectively, therein connected to a control valve 8 by which compressed air is applied alternately to one of two chambers 9, 10 defined within the cylinder 1 by the piston 2, while air is exhausted through the control valve 8 from the other of the chamber 9 or 10. The piston 2 is thus double-acting. The piston is fitted with two axially-spaced peripheral seals 11, 12 defining between them an annular gallery 13. The seals 11 and 12 are of cup-shape in cross-section and have their bases facing each other; that is they are back-to-back.

The peripheral wall of the cylinder 1 has adjacent each end thereof a pair of axially-spaced tapping ports 14, 15 and 14', 15' connected to a pressure-responsive detector 16 arranged to generate an output signal to an indicator 17. The tapping ports of each pair, that is 14 and 15 and 14' and 15', are spaced apart by an axial distance greater than the width in the axial direction of each seal 11, 12 and less than the axial distance between the seals. It is therefore possible, when the piston is adjacent an end of the cylinder for one tapping port to communicate with the annular gallery 13, while the other tapping port of the pair communicates with one or other of the chambers 9 or 10 axially beyond the piston 2.

As the piston 2 reciprocates in the cylinder 1, the tapping ports will be covered or uncovered by the piston and so the detector 16 will determine and the indicator 17 will show the position of the piston 2 in the cylinder 1. When the piston moves from the extreme left-hand position, referring to FIG. 1, to the extreme right-hand position, the pressures at the tapping ports 14 and 15 change. The pressures tapped are equal until the seal 12 moves across the tapping port 14 and momentarily into a position between the tapping ports 14 and 15 whereupon a pressure differential exists between the tapping ports 14 and 15. In this momentary condition the pressure tapped at pressure tapping port 14 is atmospheric pressure, because the pressure between the piston seals is atmospheric, and the pressure tapped at pressure tapping port 15 is the exhaust pressure. When the piston moves a little further to the right and stops at one extremity of its stroke so that the seal 11 is between the pressure tapping ports 14 and 15, the pressure tapping port 15 registers with the gallery 13 and senses the between-seal pressure, which is atmospheric pressure. Thus, there is a pressure difference between the pressure tapping port 14, which registers driving pressure, and the pressure tapping port 15, which registers atmospheric pressure, to provide an indication that the piston 2 has reached an end position in the cylinder 1. This position information can be used to control the piston movement, for example by providing an automatic piston cushioning action. By positioning the pressure tapping port such that the pressure tapping port 15 communicates in the extreme end position of the piston, with the between-seal pressure, which is atmospheric, a more pronounced pressure differential is produced than would exist between pressure tapping ports communicating with the respective driving and exhaust sides of the piston.

There may be an intermediate pair or several intermediate pairs of tapping ports, such as 14″, 15″, spaced apart by the same distances as are tapping ports 14 and 15 and 14′ and 15′, whereby movement of the piston between its end positions can be detected.

Figure 2:
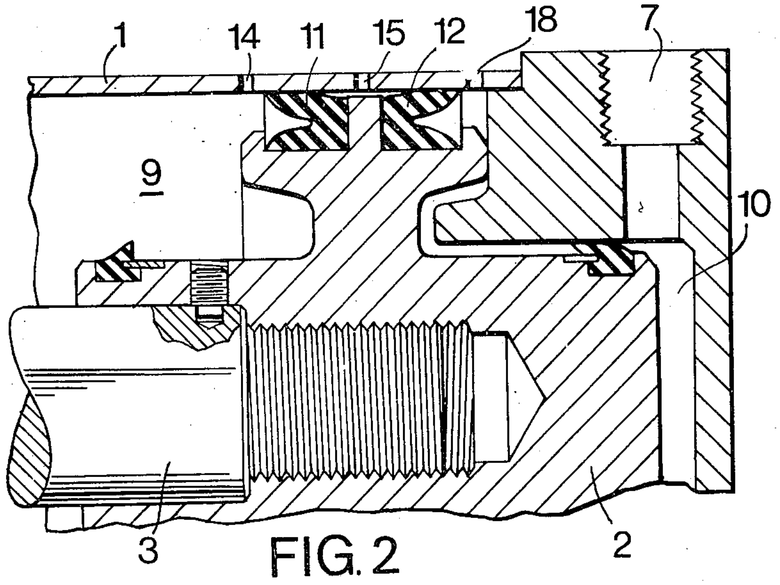
FIG. 2 is a detailed view to a larger scale of an end portion of the cylinder of the actuator showing the piston thereof adjacent that end of the cylinder and incorporating a modification.

In FIG. 2 an additional tapping port 18 is shown spaced from the tapping port 15 and nearer to the adjacent end of the cylinder. The tapping ports 15 and 18 are spaced apart axially of the cylinder by a distance substantially equal to that between the tapping ports 14 and 15. The tapping port 18 may be used instead of one or other of the tapping ports 14 and 15. An extra tapping port in a position corresponding to tapping port 18 may be provided beyond the port 15′ at the other end of the cylinder 1. The purpose of the tapping port 18 or the corresponding tapping port is to provide a slower response to piston position sensing if this should be needed. The reason for the slower response is that tapping 18 can only register the exhaust or the driving pressure and never the pressure between the seals 11 and 12, which is atmospheric, and as the exhaust pressure may sometimes be greater than atmospheric pressure due, for example, to flow restrictions in the exhaust port 7, the pressure tapped at tapping port 18 may take some time to fall to atmospheric pressure. Consequently, there may not be an immediate pressure difference between, say, pressure tapping port 14 and 18 and therefore sensing this pressure difference may not provide an immediate indication of piston position, until the exhaust pressure has fallen nearer to atmospheric pressure. Such a delayed response may be desirable.

Figure 3:
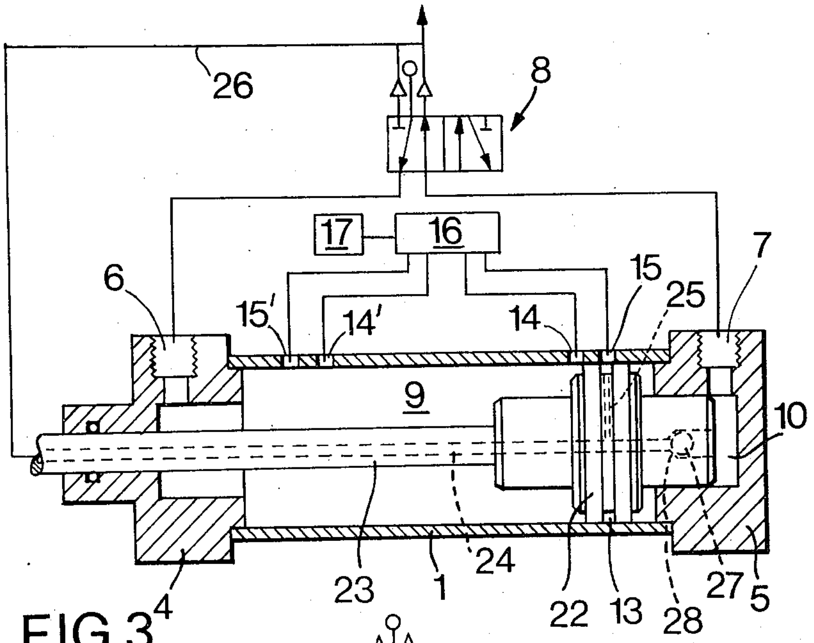
FIG. 3 is a view similar to FIG. 1 of a second actuator incorporating a piston position sensing device and showing the accompanying fluid circuit.

FIG. 3 shows a piston 22 and piston rod 23 having a longitudinal duct 24 extending therethrough and communicating through a transverse duct 25 in the piston 22 with the annular gallery 13. The piston 22 and piston rod 23 are otherwise similar to the piston 2 and piston rod 3 respectively. The duct 24 communicates through the piston rod 23 with exhaust, as indicated by the pipe connection leading to the exhaust outlets of the control valve 8, so that a pressure in the annular gallery 13 that is initially higher than exhaust will fall to exhaust pressure, thereby increasing the pressure differential between the driving pressure side of the piston and the annular gallery 13, that is between the pressures detected by the tapping ports 14, 15 or 14′, 15′, when the piston 22 is in one or the other end position. The inboard end of the longitudinal bore 24 is closable by a ball 27 which is held against a seat 28 by the driving pressure when the driving pressure is applied by the control valve 8 through the port 7. When the port 7 is connected through the control valve 8 to exhaust, the ball 27 would be moved from its seat 28 to permit a higher pressure in the annular gallery 13 to fall to exhaust pressure.

Figure 4:
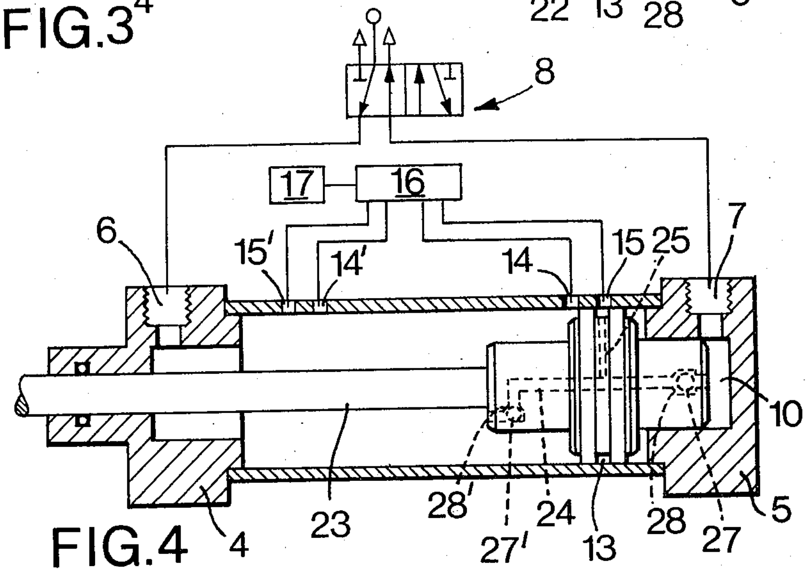
FIG. 4 is a view similar to FIG. 3 showing a modification of the actuator shown therein.

FIG. 4 is a similar arrangement to that shown in FIG. 3 in which the duct 24 extends only through the piston 22 and not through the piston rod 23 as well. Instead, both ends of the duct 24 communicate with the interior of the cylinder 1 via ball valves, each comprising a ball 27 or 27′ engageable with a seat 28 respectively or 28′. As in FIG. 3, the duct 24 communicates via a transverse duct 25 with the annular gallery 13. When the piston is at one end of the cylinder, as illustrated, one of the balls 27′ is held against the seat 28′ as the driving pressure applied through the port 6 is greater than the pressure in the annular gallery 13. The other ball 27 can move from its seat 28 to permit the pressure in the annular gallery 13 to be relieved through the exhaust port 7, thereby to provide quickly a full pressure differential between the tapping ports 14 and 15. When the piston is at the other end of the cylinder, the ball 27 would be held against its seat 28 by the driving pressure which would then be applied to the cylinder through the port 7, while the ball 27′ would be permitted to be moved from its seat to allow relief of pressure in the annular gallery 13 the exhaust port 6.

Figure 5:
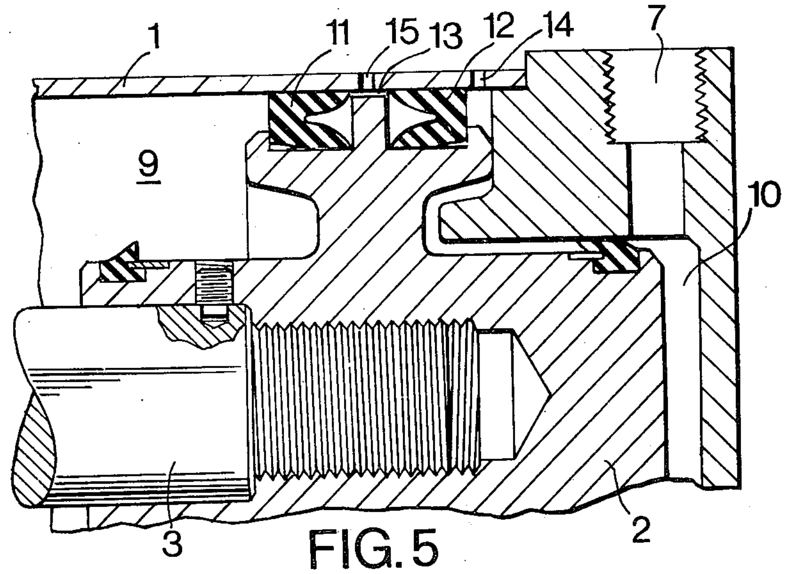
FIG. 5 is a view similar to FIG. 2 incorporating an alternative modification of the actuator shown in FIG. 1.

In the modification shown in FIG. 5, the seals 11 and 12 are reversed, that is they face each other instead of being back-to-back as in FIGS. 1 to 4. This means that the pressure between the seals in the gallery 13 is the driving pressure which leaks from the cylinder chamber 9 past the seal 11 when the piston is moving from left to right as viewed in the drawings. When the piston is moving in the opposite direction, the pressure in the cylinder chamber 10 is the driving pressure and this leaks past the seal 12 into the gallery 13. The other seal 12 (in FIG. 5) or 11 when the piston is moving in the opposite direction prevents leakage of the working fluid at the higher driving pressure from leaking to exhaust. When the seals are reversed as shown in FIG. 5, the pressure tapping port 14 is spaced from the tapping port 15 in the outboard side thereof by an axial distance greater than the width of each seal 11 and 12 and less than the axial distance between the seals and is in the position of the pressure tapping port 18 shown in FIG. 2. The pressure tapping port 14′ is in a similar position with respect to the pressure tapping port 15′ at the other end of the cylinder.

With this seal and pressure tapping port arrangements, as the piston moves from left to right towards the end position shown in FIG. 5, the pressures detected at the pressure tapping ports 15 and 14 change from both at exhaust pressure to the pressure detected at pressure tapping port 15 being the driving pressure and the pressure detected at pressure tapping port 14 being exhaust pressure, because in the end position, as illustrated, the pressure tapping port 15 communicates with the gallery 13 between the seals and the pressure tapping port 14 communicates with the exhaust. When the tapping port 7 receives driving pressure and the tapping port 6 communicates with the exhaust, both pressure tapping ports 14 and 15 detect driving pressure as soon as the seal 12 moves to the left of pressure tapping port 15. Pressure tapping ports 14' and 15' detect similar changes of pressure when the piston is at or adjacent the left-hand end of the cylinder. Thus the pressure tapping port and seal arrangements illustrated in FIG. 5 provide an indication that the piston is approaching or leaving or is in an end position in the cylinder. Although these arrangements do not give such a rapid response as do the seal and pressure tapping port arrangements shown in FIGS. 1 to 4, they do make use of the ability to tap the pressure between seals 11 and 12. An advantage of this is that the piston has only to move through the axial width of one seal to cover or uncover the pressure tapping port 15 or 15'.

What I claim as my invention and desire to secure by Letters Patent of the United States is:

1. A sensing device for sensing the position of a movable element in a fluid-operable actuator including a relatively movable piston and cylinder comprising a pair of co-pending pressure tappings in the peripheral wall of said cylinder, a pair of seals on the piston for sealing between the piston and the peripheral wall of said cylinder and spaced apart in the directions of said relative movement, the spacing of said pressure tappings being greater than the width of each of said seals in the directions of said relative movement and less than the distance between said seals in the directions of said relative movement, detector means responsive to the pressure at each said pressure tapping to give an output of magnitude determined by the position of said seals with respect to said pressure tappings and hence the position of said piston in said cylinder and indicator means to which said output is applied to indicate the position of said piston.

2. A sensing device as claimed in claim 1 in which said detector means is responsive to a pressure difference between said tappings by producing an output indicating that said piston is at a position in which the region between said seals is aligned with one of said tappings and the other of said tappings is at a position beyond one of said seals.

3. A sensing device as claimed in claim 2 in which there is a pair of said pressure tappings adjacent each end of said cylinder.

4. A sensing device as claimed in claim 3 in which at least one further pair of pressure tappings is provided in the peripheral wall of said cylinder intermediate said end pairs of pressure tappings, the pressure tappings of a said intermediate pair of pressure tappings being spaced apart in the direction of said relative movement of said piston and said cylinder by a distance greater than the width of each of said seals and less than the distance between said seals in the direction of said relative movement.

5. A sensing device as claimed in claim 1 in which there is a pair of said pressure tappings adjacent an end of said cylinder, said pressure tapping nearer to said end of said cylinder being so spaced therefrom that when said piston is in its extreme end position said pressure tapping will communicate with a region between said piston seals, and in which there is a third pressure tapping still nearer to said end of said cylinder and positioned to communicate only with a cushioning region between the outboard end of said piston and said end of said cylinder and cannot communicate with the region between said seals.

6. A sensing device as claimed in claim 1 in which said piston includes an internal duct communicating with an annular space at the periphery of said piston between said seals, said internal duct communicating through said piston with a region in the interior of said cylinder, valve means being provided in said duct to close said duct when the pressure in said region in the interior of said cylinder contains fluid at a greater pressure than that in said annular space at the periphery of said piston.

7. A sensing device as claimed in claim 1 in which each of said seals is of cup-shape in cross-section and said seals are arranged back-to-back but spaced apart axially of said piston.

8. A sensing device as claimed in claim 1 in which the outboard pressure tapping of each said end pair of pressure tappings is positioned to communicate only with a cushioning region between the outboard end of said piston and the adjacent end of said cylinder and cannot communicate with the region between said piston seals and in which each of said seals is of cup-shape in cross-section and said seals have their rims facing each other but spaced apart axially of said piston.

9. The invention as defined in claim 1 and in which said movable element further comprises said piston being relatively reciprocable in said cylinder whereby said sensing device senses the position of said piston relative to said cylinder.

* * * * *